United States Patent
Kato (10) Patent No.: US 10,277,073 B2
(45) Date of Patent: Apr. 30, 2019

(54) NON-CONTACT POWER TRANSMISSION APPARATUS AND POWER TRANSMISSION AND RECEPTION APPARATUS

(71) Applicant: TOSHIBA TEC KABUSHIKI KAISHA, Shinagawa-ku, Tokyo (JP)

(72) Inventor: Masakazu Kato, Numazu Shizuoka (JP)

(73) Assignee: TOSHIBA TEC KABUSHIKI KAISHA, Tokyo (JP)

(*) Notice: Subject to any disclaimer, the term of this patent is extended or adjusted under 35 U.S.C. 154(b) by 249 days.

(21) Appl. No.: 15/270,200

(22) Filed: Sep. 20, 2016

(65) Prior Publication Data

US 2017/0207660 A1    Jul. 20, 2017

(30) Foreign Application Priority Data

Jan. 19, 2016 (JP) .................. 2016-007538

(51) Int. Cl.
  *B41J 2/32* (2006.01)
  *H02J 50/12* (2016.01)
  *H02J 50/90* (2016.01)
  *H02J 7/02* (2016.01)
  *B41J 29/13* (2006.01)
  *B41J 29/38* (2006.01)

(52) U.S. Cl.
  CPC .............. *H02J 50/12* (2016.02); *B41J 2/32* (2013.01); *B41J 29/13* (2013.01); *B41J 29/38* (2013.01); *H02J 7/025* (2013.01); *H02J 50/90* (2016.02)

(58) Field of Classification Search
  USPC .......................................... 307/104
  See application file for complete search history.

(56) References Cited

U.S. PATENT DOCUMENTS

| 9,106,085 | B2* | 8/2015 | Yu ........................... H02J 7/025 |
| 2009/0153098 | A1 | 6/2009 | Toya et al. | |
| 2013/0270922 | A1* | 10/2013 | Kato ....................... H02J 17/00 307/104 |
| 2015/0326064 | A1 | 11/2015 | Toya et al. | |

FOREIGN PATENT DOCUMENTS

JP    2013-055779    3/2013

* cited by examiner

*Primary Examiner* — Hal Kaplan
*Assistant Examiner* — Xuan Ly
(74) *Attorney, Agent, or Firm* — Amin, Turocy & Watson LLP (57) ABSTRACT

A non-contact power transmission apparatus for transmitting electric power in a non-contact manner to a power reception apparatus comprises a housing configured to include a support section for placing the power reception apparatus and a circuit section for transmission of the electric power therein; a power transmission antenna arranged at a position corresponding to the support section of the housing and configured to transmit AC power to the power reception apparatus; and a hollow formed in the vicinity of the support section in the housing and capable of housing an end protruding to the support section side of a protrusion included in the power reception apparatus.

15 Claims, 8 Drawing Sheets

NON-CONTACT POWER TRANSMISSION APPARATUS AND POWER TRANSMISSION AND RECEPTION APPARATUS

CROSS-REFERENCE TO RELATED APPLICATION

This application is based upon and claims the benefit of priority from Japanese Patent Application No. P2016-007538, filed Jan. 19, 2016, the entire contents of which are incorporated herein by reference.

FIELD

Embodiments described herein relate generally to a power transmission apparatus for transmitting electric power in a non-contact manner to a power reception apparatus and a power transmission and reception apparatus for transmitting and receiving the electric power in a non-contact manner.

BACKGROUND

In recent years, a portable terminal apparatus such as a smart phone becomes popular which includes a non-contact charging function and can charge a secondary battery in a non-contact manner. In order to receive electric power from a power transmission apparatus in a non-contact manner to charge the secondary battery by using the received electric power, the portable terminal apparatus (power reception apparatus) is equipped with a power reception coil, a power reception circuit and a charging circuit.

There is known an electromagnetic induction system, an electric field coupling system and the like as a system for wirelessly transmitting the electric power. For example, in the electromagnetic induction system, a power transmission coil is arranged in the power transmission apparatus and a power reception coil is arranged in the power reception apparatus to transmit the electric power through the electromagnetic induction between the power transmission coil and the power reception coil. In order to charge the secondary battery in the power reception apparatus, the power transmission apparatus transmits the electric power by using frequencies in a band of about 100 kHz-200 kHz.

Incidentally, the surface of a thin-shape portable terminal apparatus such as a smart phone is planar. Thus, in order to place the portable terminal apparatus (power reception apparatus) on the power transmission apparatus, a top plate of a charging stand at the power transmission apparatus side is also planar (for example, refer to Japanese Unexamined Patent Application Publication No. 2009-247194).

On the other hand, the portable terminal apparatus is not the thin shape but has a thickness to a certain extent, and further is equipped with a protrusion. For example, it is necessary to ensure fall-proof performance to a certain extent in a portable electronic device (power reception apparatus) such as a portable type printer. Thus, a protector made of a rubber material or the like is mounted around the electronic device to protect a main body, of the electronic device at the time the electronic device drops.

However, if protrusions such as protectors are mounted around the device, at the time the electronic device is placed on the charging stand of the power transmission apparatus, as there are protrusions, the distance between the power transmission coil and the power reception coil becomes long, and the electric power transmission cannot be efficiently executed.

There is an electronic device, including protectors, which mounts a module into which the power reception coil is incorporated in a manner of protruding to the bottom of the electronic device, forms a recessed part on the charging stand of the power transmission apparatus, arranges the power transmission coil in the recessed part, and fits the module into the recessed part (refer to Japanese Unexamined Patent Application Publication No. 2013-55779).

DETAILED DESCRIPTION

DETAILED DESCRIPTION

In accordance with an embodiment, a non-contact power transmission apparatus for transmitting electric power in a non-contact manner to a power reception apparatus comprises a housing configured to include a support section for placing the power reception apparatus and a circuit section for transmission of the electric power therein, a power transmission antenna arranged at a position corresponding to the support section in the housing and configured to transmit AC power to the power reception apparatus, and a hollow formed in the vicinity of the support section of the housing and capable of housing an end protruding to the support section side of a protrusion included in the power reception apparatus.

Hereinafter, embodiments for executing the invention are described with reference to the accompanying drawings. Further, the same component in each diagram is assigned with the same symbol.

(First Embodiment)

Figure 1:
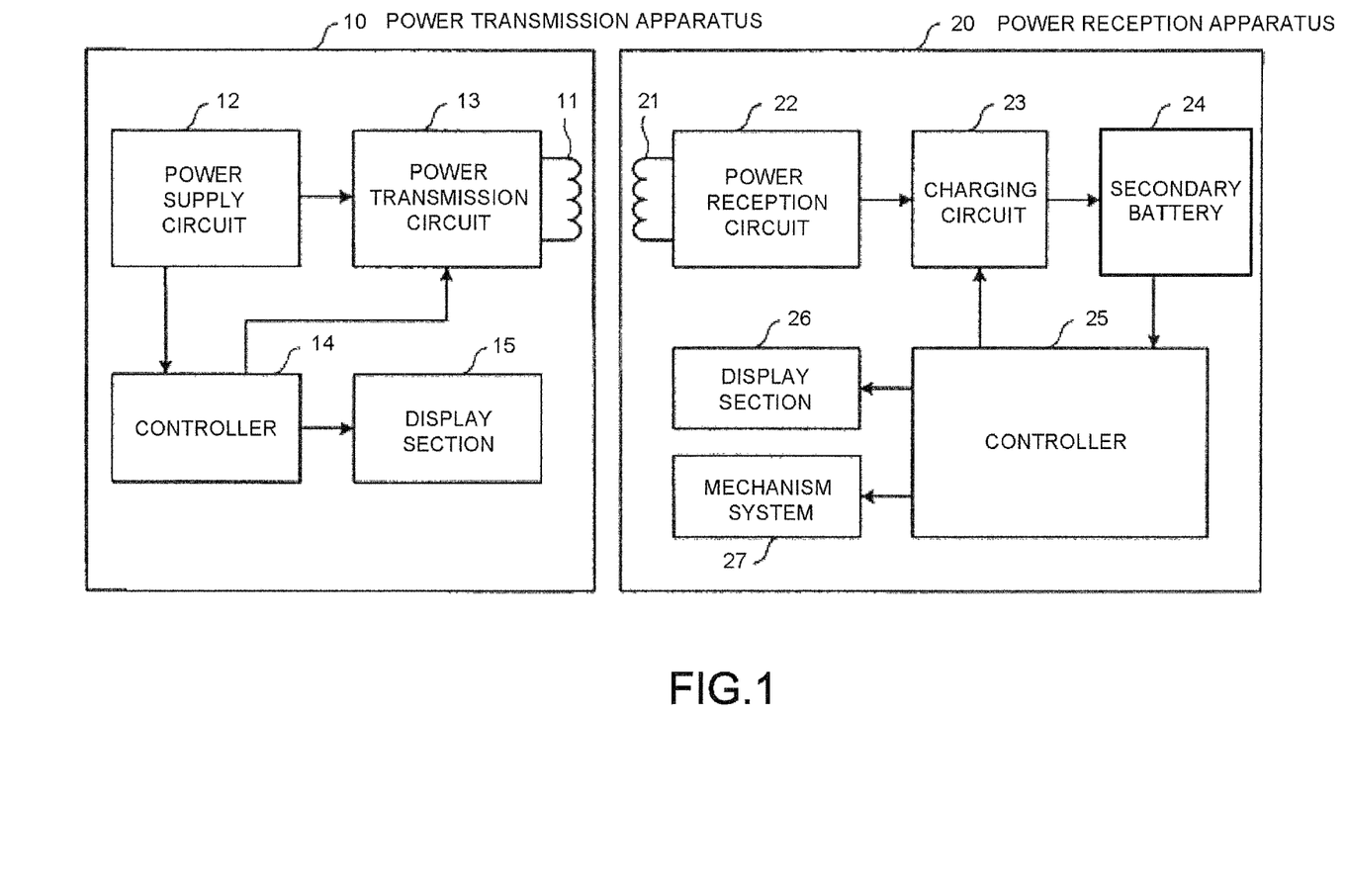
FIG. 1 is a configuration diagram illustrating a power transmission and reception apparatus according to an embodiment.

FIG. 1 is a configuration diagram illustrating a power transmission and reception apparatus according to the embodiment. In FIG. 1, the power transmission and reception apparatus is equipped with a power transmission apparatus 10 for transmitting electric power and a power reception apparatus 20 for receiving the transmitted electric power in a non-contact manner.

The power transmission apparatus 10 is equipped with a power transmission coil 11, and the power reception apparatus 20 is equipped with a power reception coil 21. The electric power output by the power transmission apparatus 10 is transmitted to the power reception apparatus 20 by using electromagnetic coupling such as electromagnetic induction or magnetic field resonance between the power transmission coil 11 and the power reception coil 21. The power transmission coil 11 constitutes a power transmission antenna, and the power reception coil 21 constitutes a power reception antenna.

The power transmission apparatus 10 is equipped with a power supply circuit 12, a power transmission circuit 13, a controller 14 and a display section 15 in addition to the power transmission coil 11. The power reception apparatus 20 is equipped with a power reception circuit 22, a charging circuit 23, a secondary battery 24, a controller 25, a display section 26 and a mechanism system 27 in addition to the power reception coil 21.

A power supply voltage is supplied from an AC adapter to the power supply circuit 12 of the power transmission apparatus 10, and the power supply circuit 12 supplies a power supply voltage suitable for each section in the power transmission apparatus 10. The power transmission circuit 13 includes a switching element and converts a direct voltage to an alternating voltage to generate high-frequency electric power to transmit the electric power from the power transmission coil 11. The frequency for transmitting the electric power is, for example, about 100 kHz~200 kHz.

The controller 14 is a microcomputer including a CPU. The controller 14 controls the switching element of the power transmission circuit 13 to control energization of the power transmission coil 11. The display section 15 is composed of an LED and liquid crystal display, and displays the state of the power transmission apparatus 10.

The power reception apparatus 20 is a portable electronic device, for example, a portable printer. In the following description, a portable printer 20 is described as the power reception apparatus 20. The power reception coil 21 of the printer 20 receives the electric power through the electromagnetic coupling such as the electromagnetic induction with the power transmission coil 11. The power reception circuit 22 receives the AC power generated by the power transmission circuit 13 of the power transmission apparatus 10.

In order to efficiently transmit the electric power, it is necessary to enable the power transmission coil 11 to be close to the power reception coil 21. In the transmission of the electric power of about 5 W~10 W usually used in the electric power transmission to the electronic device through the electromagnetic induction system, from the point of view of building the power reception coil 21 in the electronic device, the diameters of the power transmission coil 11 and the power reception coil 21 are about several cm, or uses a small circular coil or a square-shaped coil equal to or smaller than several cm. If considering the transmission efficiency, it is necessary to suppress the space between the power transmission coil 11 and the power reception coil 21 within about 10 mm at a maximum.

The charging circuit 23 converts the AC power received by the power reception circuit 22 to the DC power to supply the DC power to the secondary battery 24. The controller 25, for example, detects the voltage of the secondary battery 24 and controls the charging circuit 23 to stop the charging of the secondary battery 24 by the charging circuit 23 if the voltage reaches a predetermined voltage. Further, if the voltage of the secondary battery 24 is below the predetermined value, the controller 25 controls the charging circuit 23 to restart the charging of the secondary battery 24 by the charging circuit 23. The controller 25 is composed of a microcomputer and controls the display of the display section 26, printing by the printer 20 and operations of the mechanism system 27 such as a paper feeding operation in addition to the control of the charging circuit 23.

The power transmission apparatus 10 functions as a charging apparatus to transmit the AC power for charging of the secondary battery 24 of the power reception apparatus 20.

Figure 2:
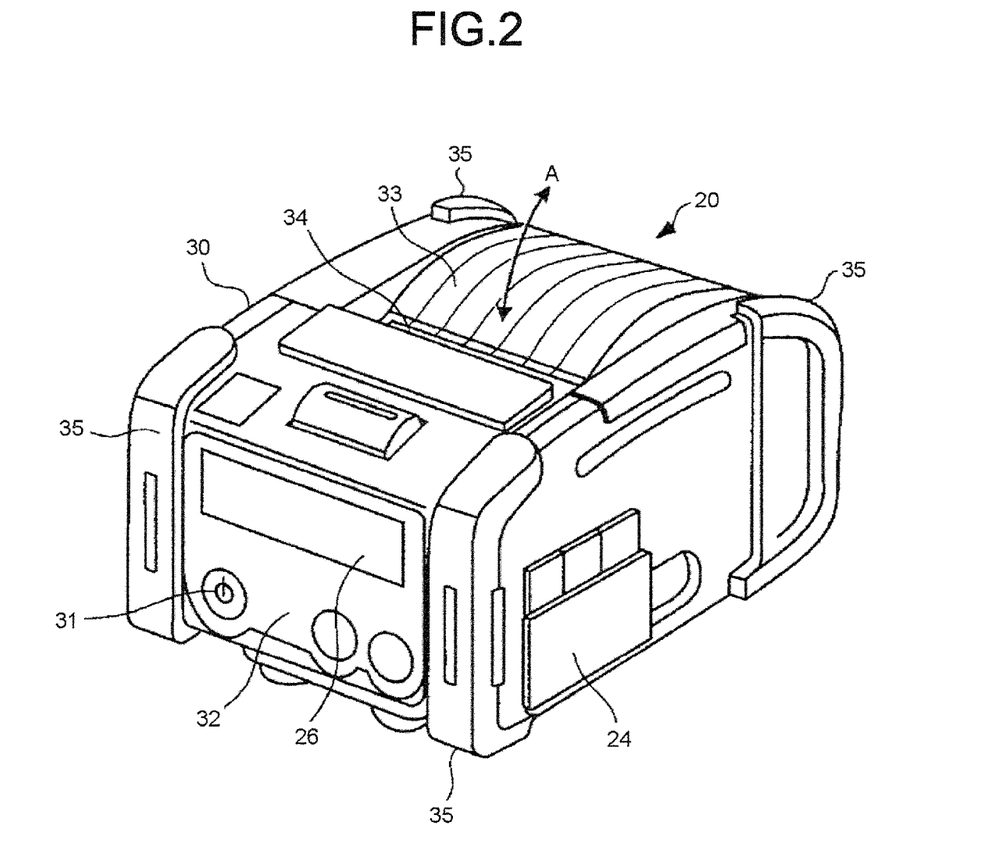
FIG. 2 is a perspective view illustrating the appearance of a power reception apparatus (portable printer) according to the embodiment.

FIG. 2 is a perspective view illustrating the appearance of the portable printer 20 (power reception apparatus). The printer 20 is almost rectangular shape with a thickness different from the smart phone and mobile phone. The printer 20 includes the secondary battery 24, and operates through the electric power stored by the secondary battery 24. The printer 20 stores a paper (not shown) wound into a roll shape, and prints on the paper. The paper is, for example, a thermal paper, a label paper wound into a roll shape or a voucher paper.

As shown in FIG. 2, the printer 20 has a substantially rectangular housing 30 and the display section 26 on the front surface of the housing 30. An operation section 32 including a power supply switch 31, a feed button, a temporary stop button and the like is arranged in the printer 20. The display section 26 is, for example, a liquid crystal display device.

The housing 30 is equipped with an openable cover 33 arranged at the upper part thereof, and can open and close one end of the cover 33 in an arrow A direction. If the cover 33 is opened, the inside of the housing 30 comes out, and the paper can be set in the housing 30. The printer 20 has mechanism systems including a paper holding section, a thermal head, a platen roller, a motor for rotationally driving the platen roller at the inside of the housing 30, which are not shown.

In the printer 20, the platen roller is rotationally driven by the motor in a state of sandwiching the paper between the platen roller and the thermal head, thus, the platen roller conveys the paper. In the conveyance process of the paper, the thermal head carries out printing on the paper. The paper after the printing is discharged from a paper discharging port 34 arranged at the upper part of the housing 30 to the cover 33.

The power reception coil 21 (refer to FIG. 1) is built at the bottom of the housing 30 of the printer 20. As the printer 20 is often used for job, and is also often carried, the printer 20 is required to have a certain degree of robustness. Thus, protectors 35 such as rubber with the cushioning properties for protecting the main body of the housing 30 at the time of falling are mounted at four corners of the printer 20.

Figure 3:
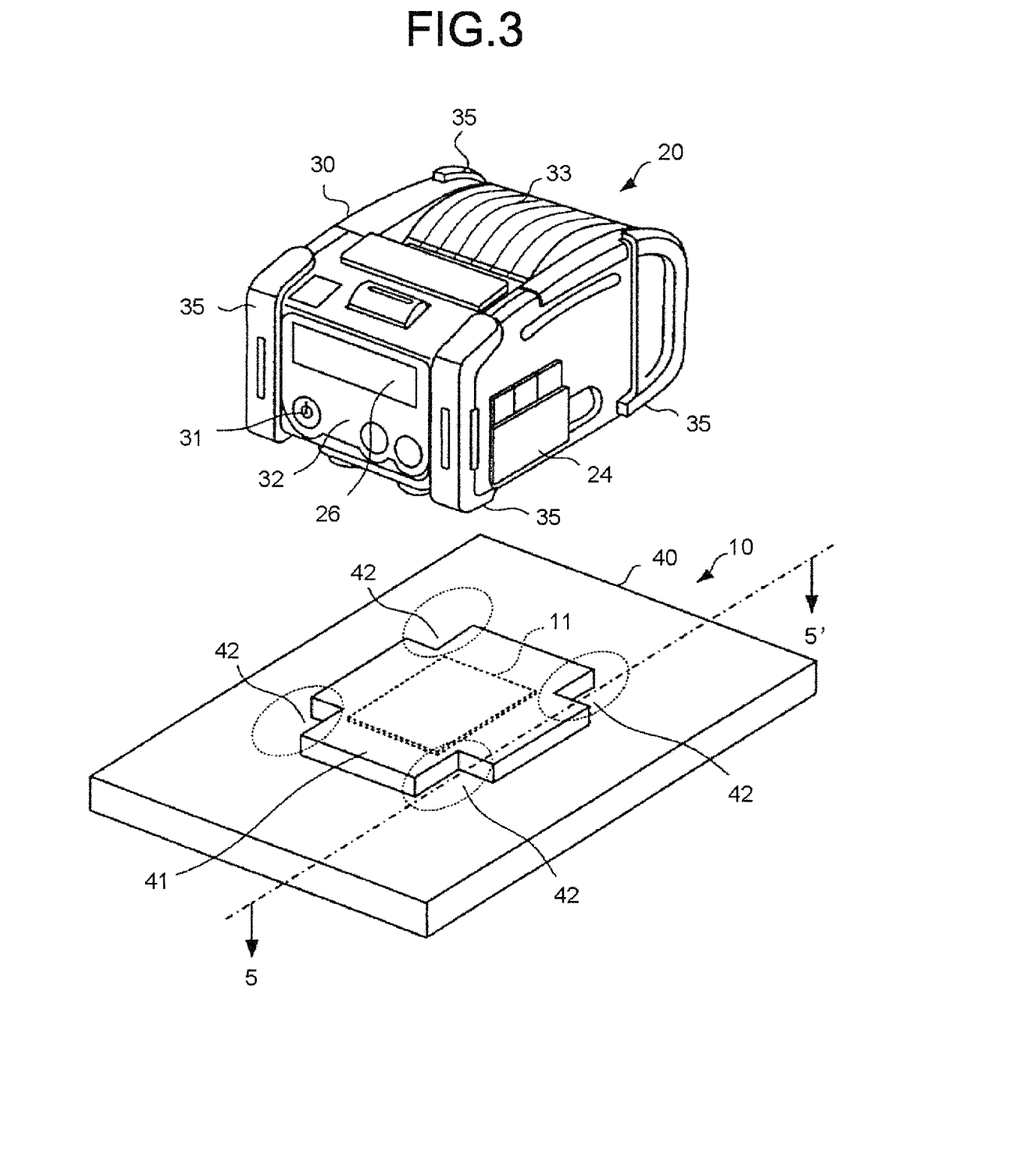
FIG. 3 is a perspective view illustrating an appearance of a power transmission apparatus and the power reception apparatus according to the embodiment.

FIG. 3 is a perspective view illustrating the appearance of the power transmission apparatus 10 and the printer 20. As shown in FIG. 3, the power transmission apparatus 10 has a flat rectangular housing 40. As the printer 20 is placed on the upper surface of the housing 40, the housing 40 is a charging stand if stated differently. A support section 41 for supporting the printer 20 protrudes on the upper surface of the housing 40, and the power transmission coil 11 is arranged at the ceiling part of the inner surface of the support section 41.

As the protector 35 of the printer 20 protrudes towards the lower side with respect to the bottom surface of the housing 30, if the housing 40 of the power transmission apparatus 10 is flat, at the time of placing the printer 20 on the housing 40 (charging stand), a gap between the bottom surface of the printer 20 and the ceiling part of the power transmission apparatus 10 is vacant, and the power transmission coil 11 and the power reception coil 21 cannot approach each other.

Thus, in the embodiment, as shown in FIG. 3, the support section 41 of the power transmission apparatus 10 becomes a convex shape with respect to the upper surface of the housing 40. Notches 42 are formed (reference part in circle of the dotted line) at the four corners of the convex-shape support section 41 to fit the bottom surface part of the protector 35 of the printer 20. The power transmission coil 11 is arranged at the ceiling part of the inside of the support section 41. By forming the notches 42, hollows capable of housing the bottom surface parts (ends protruding to the support section 41 side) of the protectors 35 serving as protrusions are formed in the vicinity of the support section 41.

Thus, at the time of placing the printer 20 on the support section 41 of the power transmission apparatus 10, the bottom surface parts of the protectors 35 are fit into the parts of the notches 42, and the upper surface of the convex-shape support section 41 adheres to the bottom surface of the printer 20. As a result, the power transmission coil 11 can be close to the power reception coil 21. In fact, it is necessary to consider the thickness of the housing 30 of the printer 20 and the thickness of the housing 40 containing the support section 41; however, the distance between the power transmission coil 11 and the power reception coil 21 can be set to a distance within 5 mm.

Further, the position at which the notch 42 is arranged is necessary to correspond to the position of the protector 35, and it is needless to say that the shape and the size of the notch 42 are necessary to set in accordance with the shape and the size of the protector 35.

Figure 4:
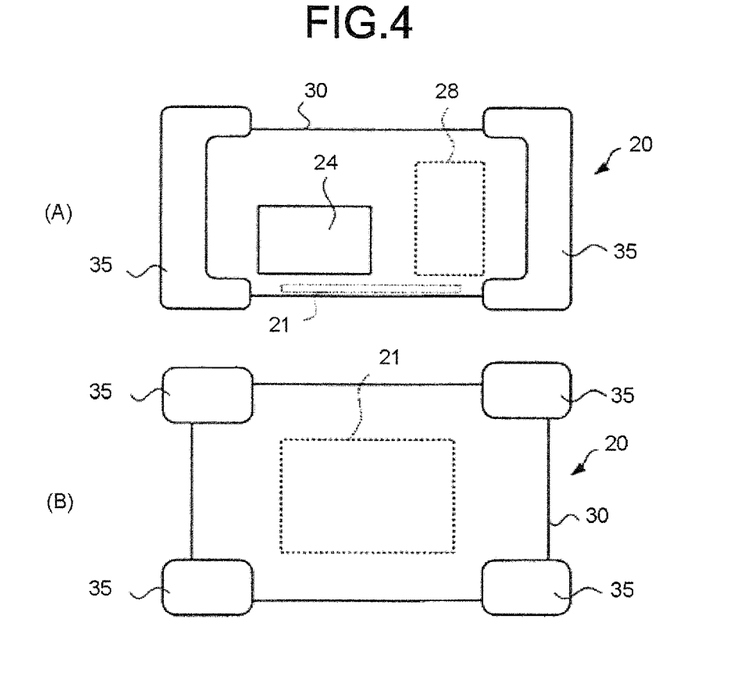
FIG. 4 is a side view and a bottom view schematically illustrating the power reception apparatus (portable printer) according to the embodiment.

FIG. 4(A) schematically illustrates the side view of the printer 20, and FIG. 4(B) schematically illustrates the bottom view of the printer 20. As can be known from FIGS. 4(A) and (B), the printer 20 is equipped with the power reception coil 21 at the center part of the bottom surface of the housing 30. A circuit section 28 for power reception including the power reception circuit 22, the charging circuit 23 and the controller 25 of the power reception apparatus 20 is arranged in the housing 30. The circuit section 28 is schematically illustrated, and is composed of a circuit substrate and circuit components in fact.

Figure 5:
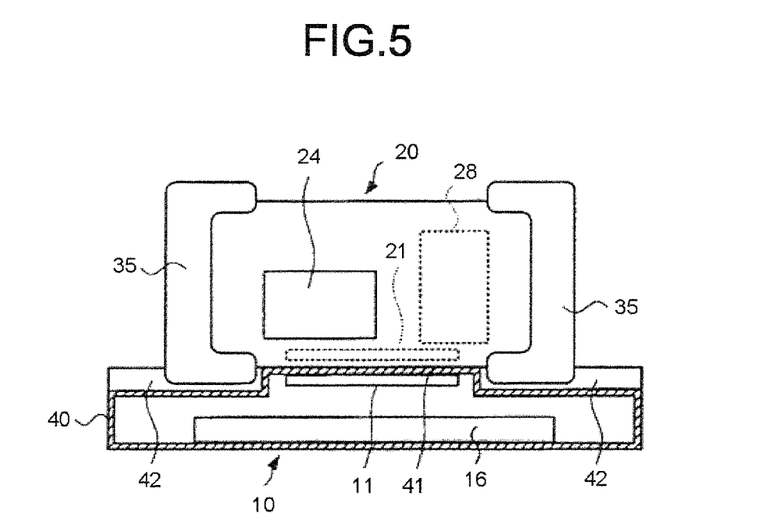
FIG. 5 is a side view illustrating a position relationship at the time of placing the power reception apparatus (portable printer) on the power transmission apparatus according to the embodiment.

FIG. 5 is a side view illustrating a position relationship at the time of placing the printer 20 on the support section 41 of the housing 40 of the power transmission apparatus 10, and the housing 40 is shown by a cross section diagram along an arrow 5-5' line of FIG. 3. The power transmission coil 11 is mounted at the ceiling part of the support section 41 on the upper part in the housing 40, and a circuit section 16 for power transmission including the power supply circuit 12, the power transmission circuit 13 and the controller 14 of the power transmission apparatus 10 is arranged in the housing 40. The circuit section 16 is schematically illustrated, and is composed of a circuit substrate and circuit components in fact.

At the time of placing the printer 20 on the support section 41 of the power transmission apparatus 10, the bottom surface part of the protector 35 is fit into the notch 42 of the support section 41. On the other hand, as the power reception coil 21 is arranged at the bottom surface of the housing 30 of the printer 20, the power transmission coil 11 can be close to the power reception coil 21, for example, the distance between the power transmission coil 11 and the power reception coil 21 can be set to a distance within 5 mm.

As the notches 42 are positioned at the four corners of the support section 41, the notches 42 have the function of determining a position at the time of placing the printer 20 on the support section 41. Thus, only by fitting the protector 35 of the printer 20 into the notch 42, the positions of the power transmission coil 11 and the power reception coil 21 can be aligned without the need for special considerations. As a result, the position of the printer 20 is determined, and as the deviation of the position in the horizontal direction can be suppressed to the minimum, the power reception coil 21 is oppositely arranged substantially right on the power transmission coil 11.

Thus, according to the first embodiment, as the power transmission coil 11 is close to the power reception coil 21 and the positions of the power transmission coil 11 and the power reception coil 21 can be easily aligned, the power transmission can be efficiently executed.

(Second Embodiment)

Next, the power transmission and reception apparatus according to the second embodiment is described with reference to FIG. 6 and FIG. 7.

Figure 6:
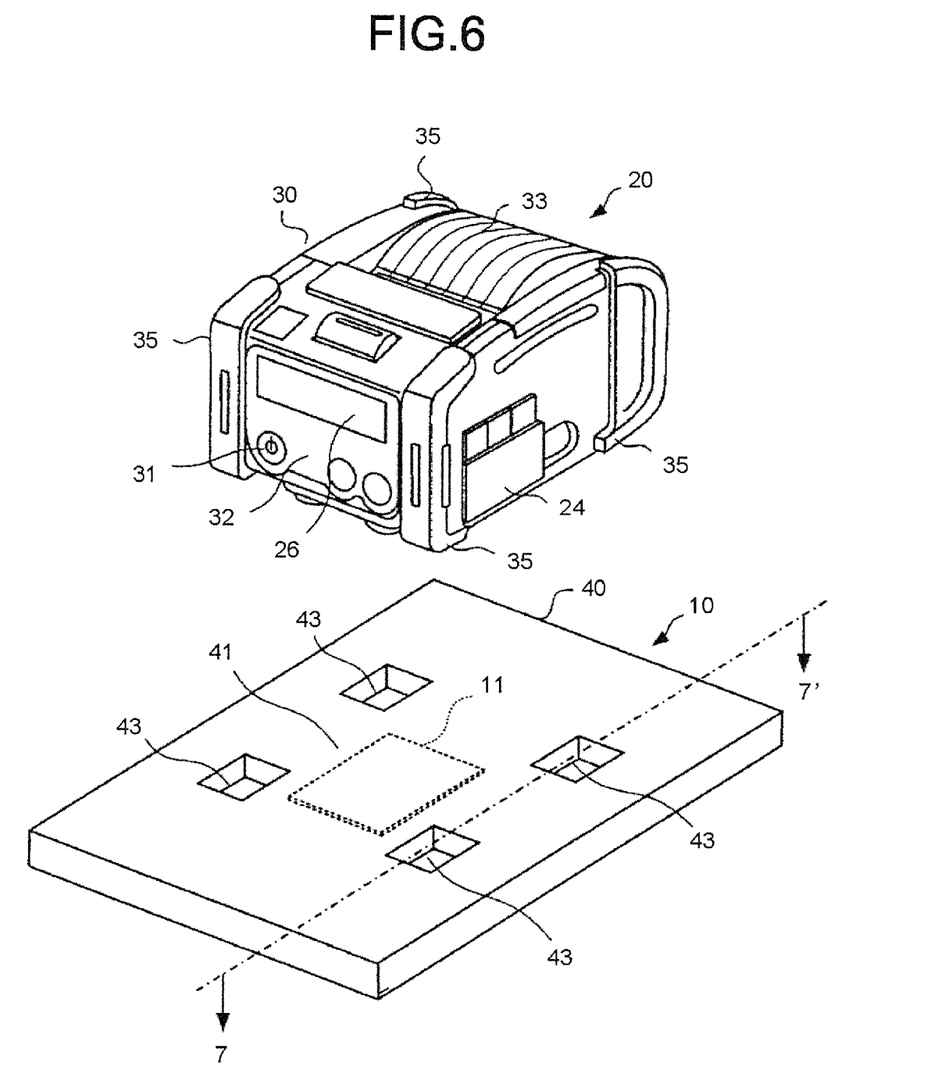
FIG. 6 is a perspective view illustrating the appearance of a power transmission apparatus and a power reception apparatus according to a second embodiment.

FIG. 6 is a perspective view illustrating the appearance of the power transmission apparatus 10 and the power reception apparatus 20. As shown in FIG. 6, the power transmission apparatus 10 has a flat rectangular housing 40. As the printer 20 is placed on the upper surface of the housing 40, the housing 40 is a charging stand if stated differently. A plurality of (four) recesses 43 is arranged on the upper surface of the support section 41.

The recesses 43 are arranged at positions corresponding to the protectors 35 of the printer 20, and the power transmission coil 11 is arranged at the ceiling part of the housing 40 in an area (support section 41) surrounded by the plurality of the recesses 43. By forming the recesses 43, hollows capable of housing the bottom surface parts (ends protruding to the support section 41 side) of the protectors 35 are formed in the vicinity of the support section 41. The bottom surface part of the protector 35 of the printer 20 is fit into the hollow (recess 43).

Thus, at the time of placing the printer 20 on the support section 41 of the power transmission apparatus 10, the bottom surface part of the protector 35 is fit into the recess 43, and the upper surface of the support section 41 adheres to the bottom surface of the printer 20. As a result, the power transmission coil 11 can be close to the power reception coil 21. In fact, it is necessary to consider the thickness of the housing 30 of the printer 20 and the thickness of the housing 40 containing the support section 41; however, the distance between the power transmission coil 11 and the power reception coil 21 can be set to a distance within 5 mm.

Further, the position at which the recess 43 is arranged is necessary to correspond to the position of the protector 35, and it is needless to say that the shape and the size of the recess 43 are necessary to set in accordance with the shape and the size of the protector 35.

Figure 7:
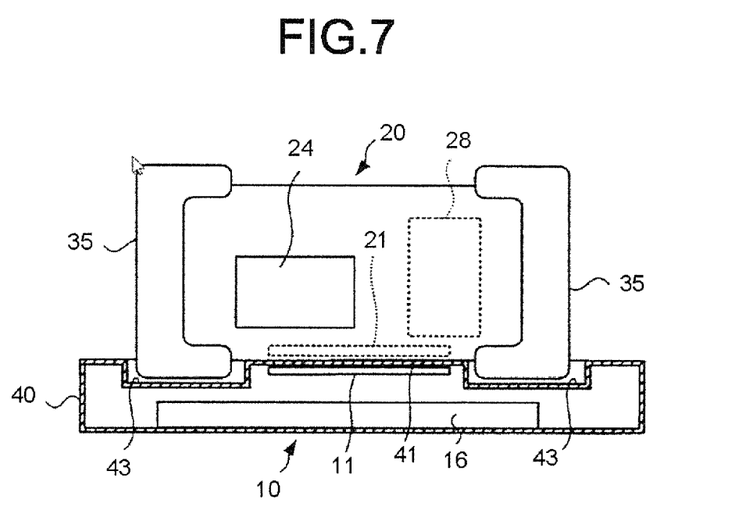
FIG. 7 is a side view illustrating the position relationship at the time of placing the power reception apparatus (portable printer) on the power transmission apparatus according to the second embodiment.

FIG. 7 is a side view illustrating the position relationship at the time of placing the printer 20 on the support section 41 of the housing 40 of the power transmission apparatus 10, and the housing 40 is shown by a cross section diagram along an arrow 7-7' line of FIG. 6. The power transmission coil 11 is mounted at the ceiling part of the area (support section 41) surrounded by the recesses 43 on the upper part in the housing 40, and a circuit section 16 for power transmission including the power supply circuit 12, the power transmission circuit 13 and the controller 14 of the power transmission apparatus 10 is arranged in the housing 40. The circuit section 16 is schematically illustrated, and thus is composed of a circuit substrate and circuit components in fact.

At the time of placing the printer 20 on the support section 41 of the power transmission apparatus 10, the bottom surface part of the protector 35 is fit into the recess 43 of the housing 40. On the other hand, as the power reception coil 21 is arranged at the bottom surface of the housing 30 of the printer 20, the power transmission coil 11 can be close to the power reception coil 21. For example, the distance between the power transmission coil 11 and the power reception coil 21 can be set to a distance within 5 mm.

The recess 43 has the function of determining the position at the time of placing the printer 20 on the support section 41. Thus, only by fitting the protector 35 of the printer 20 into the recess 43, the positions of the power transmission coil 11 and the power reception coil 21 can be aligned without the need for special considerations. As a result, as the position of the printer 20 can be determined, the deviation of the position in the horizontal direction can be suppressed to the minimum, and the power reception coil 21 can be oppositely arranged substantially right on the power transmission coil 11.

Thus, according to the second embodiment, as the power transmission coil 11 is close to the power reception coil 21 and the positions of the power transmission coil 11 and the power reception coil 21 can be easily aligned, the power transmission can be efficiently executed.

Further, as it is a non-contact power transmission based on the electromagnetic coupling system, it is not necessary to strictly align the position up to 1~2 mm, for example, as the deviation of the position within about 5 mm~10 mm is allowed, the recess 43 may also be enlarged to a certain degree so that the printer 20 can be easily placed.

Figure 8:
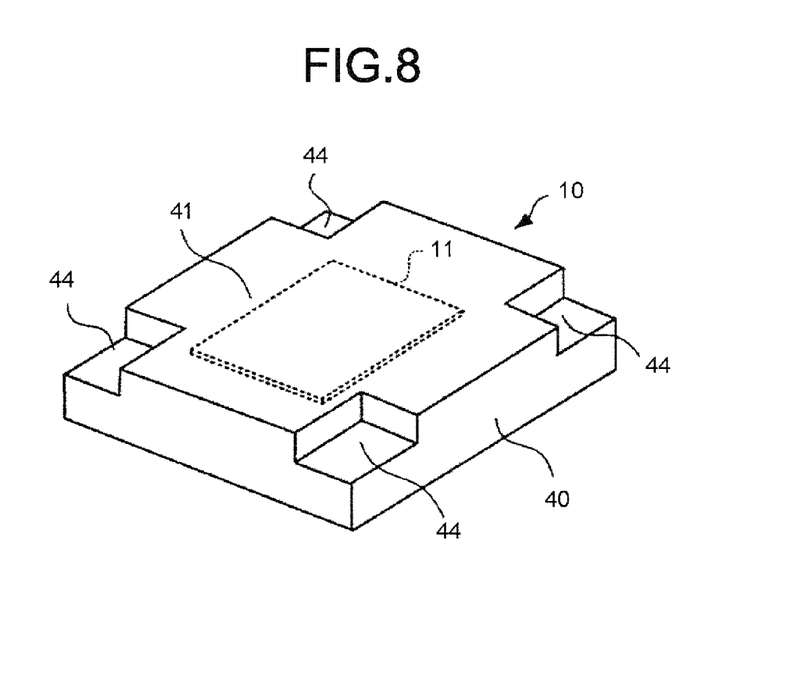
FIG. 8 is a perspective view illustrating another configuration of the power transmission apparatus according to the second embodiment.

FIG. 8 is a perspective view illustrating another configuration of the power transmission apparatus 10. FIG. 8 shows an example in which the size of the housing 40 is equal to or smaller than the printer 20, four corners of the housing 40 are cut out, and recesses 44 are arranged at four corners. As shown in FIG. 8, the power transmission coil 11 is arranged at the ceiling part of the center part of the housing 40 of the power transmission apparatus 10.

The recesses 44 are formed by cutting out four corners of the housing 40 to fit the bottom surface parts of the protectors 35 of the printer 20. An area surrounded by a plurality of the recesses 44 becomes the support section 41 for placing the printer 20. By forming the recesses 44, hollows capable of housing the bottom surface parts (ends protruding to the support section 41 side) of the protectors 35 are formed in the vicinity of the support section 41.

Thus, at the time of placing the printer 20 on the support section 41 of the power transmission apparatus 10, the bottom surface part of the protector 35 is fit into the recess 44, and the upper surface of the support section 41 adheres to the bottom surface of the printer 20. As a result, the power transmission coil 11 can be close to the power reception coil 21.

(Third Embodiment)

Figure 9:
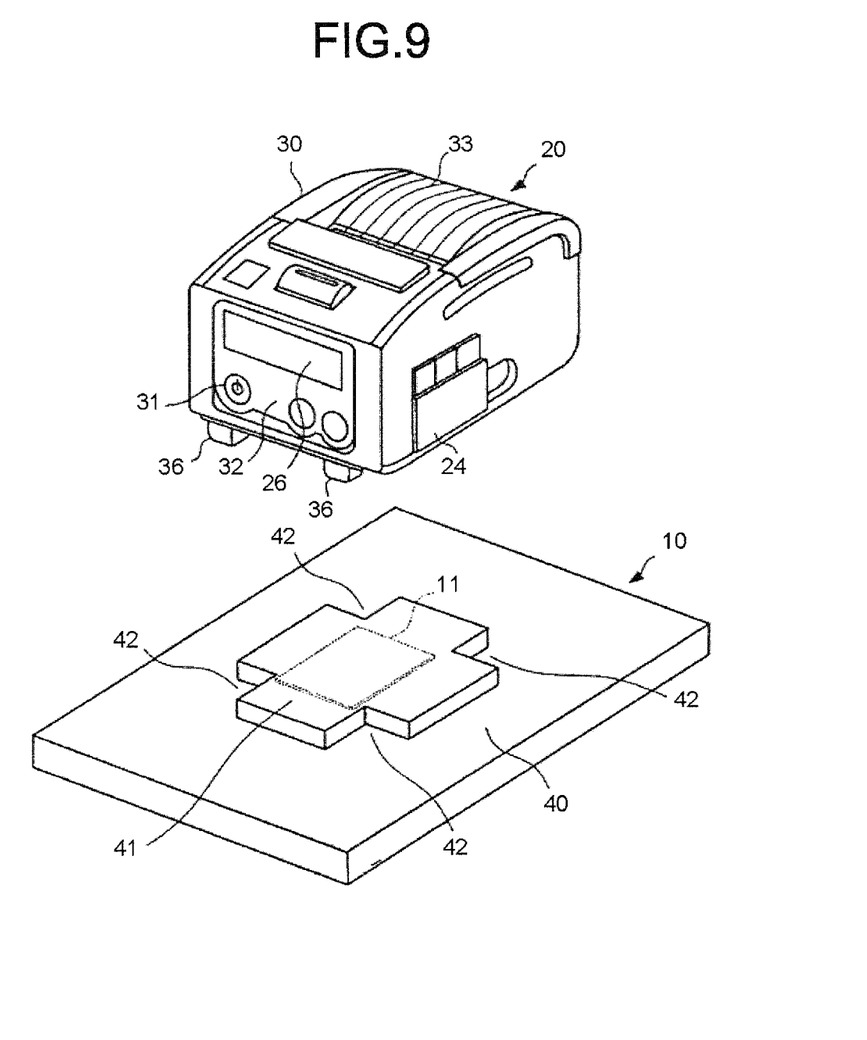
FIG. 9 is a perspective view illustrating the appearance of a power transmission apparatus and a power reception apparatus according to a third embodiment.

Next, the power transmission and reception apparatus according to the third embodiment is described with reference to FIG. 9. FIG. 9 is a perspective view illustrating the appearance of the power transmission apparatus 10 and the power reception apparatus 20. In the first and the second embodiments, the portable printer 20 including the protector 35 is exemplified, and the printer used on a table can be also applicable. FIG. 9 illustrates a tabletop printer 20, and the printer 20 includes a plurality of (for example, four) legs 36 at the bottom surface.

As shown in FIG. 9, the power transmission apparatus 10 has a flat rectangular housing 40. A support section 41 for supporting the printer 20 protrudes on the upper surface of the housing 40, and the power transmission coil 11 is arranged at the ceiling part of the support section 41.

As the leg 36 of the printer 20 protrudes towards the lower side with respect to the bottom surface of the housing 30, if the housing 40 of the power transmission apparatus 10 is flat, at the time of placing the printer 20 on the housing 40 (charging stand), a gap between the bottom surface of the printer 20 and the ceiling part of the power transmission apparatus 10 is vacant, and the power transmission coil 11 and the power reception coil 21 cannot adhere to each other.

Thus, in the third embodiment, as shown in FIG. 9, the support section 41 of the power transmission apparatus 10 becomes a convex shape with respect to the upper surface of the housing 40. Notches 42 are formed at the four corners of the convex-shape support section 41 to fit the legs 36 of the printer 20. The power transmission coil 11 is arranged at the ceiling part of the inside of the support section 41. By forming the notches 42, hollows capable of housing the legs 36 are formed in the vicinity of the support section 41.

Further, the position at which the notch 42 is arranged is necessary to correspond to the position of the legs 36, and it is needless to say that the shape and the size of the notch 42 are necessary to set in accordance with the shape and the size of the leg 36.

Thus, at the time of placing the printer 20 on the support section 41 of the power transmission apparatus 10, the upper surface of the convex-shape support section 41 adheres to the bottom surface of the printer 20, and the leg 36 is fit into the notch 42. As a result, the power transmission coil 11 can be close to the power reception coil 21.

Further, the power transmission apparatus 10 in FIG. 9 can use the same configuration as that shown in FIG. 6 and FIG. 8. In this case, it is necessary to arrange the recesses 43 arranged in the housing 40 shown in FIG. 6 at positions corresponding to the legs 36 of the printer 20 respectively. It is necessary to arrange the recesses 44 arranged in the housing 40 shown in FIG. 8 at positions corresponding to the legs 36 of the printer 20.

Further, the power transmission and reception apparatus according to the foregoing embodiments is described on the premise of the electromagnetic coupling system such as the electromagnetic induction; however, it is not limited to the electromagnetic induction system. For example, the power transmission and reception apparatus of the electric field coupling system using the power transmission antenna (electrode) and the power reception antenna (electrode) can also be applicable.

Figure 10:
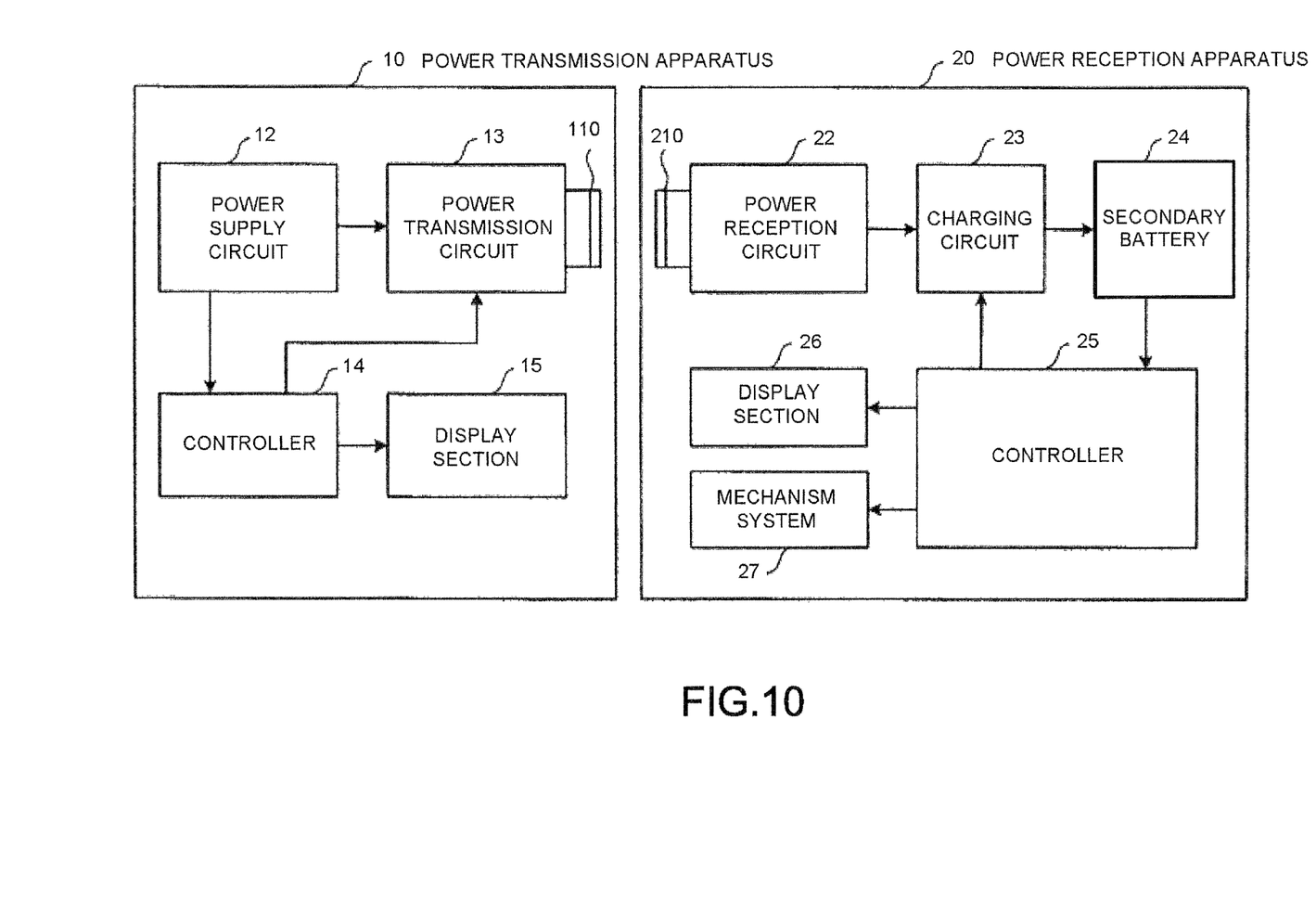
FIG. 10 is a configuration diagram illustrating a power transmission and reception apparatus of an electric field coupling system according to the embodiment.

FIG. 10 is a configuration diagram illustrating a power transmission and reception apparatus of the electric field coupling system. In FIG. 10, the power transmission and reception apparatus is equipped with a power transmission apparatus 10 for transmitting the electric power and a power reception apparatus 20 for receiving the transmitted electric power in a non-contact manner. The configurations of the power transmission apparatus 10 and the power reception apparatus 20 are the same as those shown in FIG. 1, and the detailed description thereof is omitted.

In FIG. 10, a power transmission electrode 110 is used instead of the power transmission coil 11, and a power reception electrode 210 is used instead of the power reception coil 21. The power transmission electrode 110 constitutes the power transmission antenna, and the power reception electrode 210 constitutes the power reception antenna.

In FIG. 10, the power transmission circuit 13 of the power transmission apparatus 10 converts the direct voltage to a high frequency alternating voltage to generate a high-frequency AC signal and supplies an alternating signal to the power transmission electrode 110 to emit the alternating signal to an external device. The power reception electrode 210 of the power reception apparatus 20 receives the AC signal which is emitted from the power reception electrode 110 through the electric field coupling, and the power reception circuit 22 receives the AC power generated by the power transmission circuit 13 of the power transmission apparatus 10.

In the case of the electric field coupling system, the power transmission electrode 110 and the power reception electrode 210 approaches to each other to generate the electric field between the electrodes 110 and 210, and the electric power is supplied in a non-contact manner by utilizing the electric field. In order to efficiently transmit the electric power, it is necessary to enable the power transmission electrode 110 to be close to the power reception electrode 210. Therefore, the housing 40 of the power transmission apparatus 10 includes hollows formed by the notches 42 or the recesses 43 as shown in FIG. 3 or FIG. 6 in accordance with the configuration of the power reception apparatus 20 (for example, the printer 20). The hollows may be optional as long as they can house protrusions (protectors 35 or legs 36) of the power reception apparatus 20.

Further, in the embodiment described above, the portable printer 20 as the power reception apparatus is described as an example; however, the device that is charged in a non-contact manner is not limited to the portable printer 20, and may be other electronic devices. Although an example in which the protector 35 or the leg 36 protrudes from the bottom surface of the printer 20 is described, if there is a protrusion on the bottom surface of the electronic device, the notches 42 or the recesses 43 and 44 may be arranged in the power transmission apparatus 10 so that the protrusions are fitted.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. A power transmission apparatus, comprising:
a housing configured to include a support surface for placing a power reception apparatus and a circuit for transmission of electric power therein;
a power transmission antenna arranged at a position corresponding to the support surface in the housing and configured to transmit AC power in a non-contact manner to the power reception apparatus; and
a house section formed on a surface side has the support surface of the housing and houses an end of a protrusion included in a bottom surface of the power reception apparatus, wherein
a bottom surface of the house section is located on an opposite side of the power reception apparatus that is placed on the support surface.

2. The power transmission apparatus according to claim 1, wherein
the house section is a recess.

3. The power transmission apparatus according to claim 1, wherein
the power transmission antenna is formed by a power transmission coil for transmitting the electric power to the power reception apparatus through electromagnetic induction coupling.

4. The power transmission apparatus according to claim 1, wherein
the power transmission antenna is formed by a power transmission electrode for transmitting the electric power to the power reception apparatus through electric field coupling.

5. A power transmission and reception apparatus, comprising:
a power reception apparatus; and
a power transmission apparatus,
the power transmission apparatus comprises:
a first housing configured to include a support surface for placing a bottom surface of the power reception apparatus and a circuit for transmission of electric power therein;
a power transmission antenna arranged at a position corresponding to the support surface in the first housing and configured to transmit AC power in a non-contact manner to the power reception apparatus,
the power reception apparatus comprises:
a second housing at the inside of which a circuit for receiving the electric power is arranged;
a power reception antenna arranged on the bottom surface of the second housing and configured to receive the AC power from the power transmission apparatus,
wherein
the second housing includes a protrusion protruding from the bottom surface thereof,
the first housing includes a house section formed a surface side has the support surface, and houses an end of the protrusion of the power reception apparatus, and
a bottom surface of the house section is located on opposite side of the power reception apparatus that is placed on the support surface.

6. The power transmission apparatus according to claim 1, wherein
the house section is a notch.

7. The power transmission apparatus according to claim 1, wherein
when the protrusion of the second housing is fit into the house section, the power transmission antenna is oppositely arranged to a power reception antenna.

8. The power transmission apparatus according to claim 1, wherein
the house section is formed at a vicinity of the support surface.

9. The power transmission and reception apparatus according to claim 5, wherein
the house section is a recess.

10. The power transmission and reception apparatus according to claim 5, wherein
the house section is a notch.

11. The power transmission and reception apparatus according to claim 5, wherein the power transmission antenna is formed by a power transmission coil for transmitting the electric power to the power reception apparatus through electromagnetic induction coupling.

12. The power transmission and reception apparatus according to claim 5, wherein the power transmission antenna is formed by a power transmission electrode for transmitting the electric power to the power reception apparatus through electric field coupling.

13. The power transmission and reception apparatus according to claim 5, wherein when the protrusion of the second housing is fit into the house section, the power transmission antenna is oppositely arranged to the power reception antenna.

14. The power transmission and reception apparatus according to claim 5, wherein the power reception apparatus is a printer.

15. The power transmission and reception apparatus according to claim 5, wherein the house section is formed at a vicinity of the support surface.

* * * * *